US010817665B1

(12) United States Patent
Yu et al.

(10) Patent No.: US 10,817,665 B1
(45) Date of Patent: Oct. 27, 2020

(54) SYSTEMS AND METHODS FOR WORD SEGMENTATION BASED ON A COMPETING NEURAL CHARACTER LANGUAGE MODEL

(71) Applicant: COUPANG CORP., Seoul (KR)

(72) Inventors: Shusi Yu, Shanghai (CN); Jing Li, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/869,741

(22) Filed: May 8, 2020

(51) Int. Cl.
| | | |
|---|---|---|
| G06F 17/27 | (2006.01) |
| G06F 17/28 | (2006.01) |
| G10L 15/19 | (2013.01) |
| G06F 40/279 | (2020.01) |
| G06Q 30/06 | (2012.01) |
| G06N 3/08 | (2006.01) |
| G06Q 10/08 | (2012.01) |

(52) U.S. Cl.
CPC .......... *G06F 40/279* (2020.01); *G06N 3/08* (2013.01); *G06Q 30/0603* (2013.01); *G06Q 10/087* (2013.01)

(58) Field of Classification Search
CPC ... G10L 15/19; G06F 17/278; G06F 17/2785; G06F 17/2818
See application file for complete search history.

(56) References Cited

U.S. PATENT DOCUMENTS

| 6,529,902 B1 * | 3/2003 | Kanevsky | G06F 16/355 |
| 8,938,385 B2 * | 1/2015 | Yan | G06F 40/30 |
| | | | 704/9 |
| 10,402,495 B1 * | 9/2019 | Rush | G10L 15/197 |

(Continued)

FOREIGN PATENT DOCUMENTS

| CN | 107168955 A | * | 9/2017 |
| CN | 109815476 A | * | 5/2019 |

(Continued)

OTHER PUBLICATIONS

Nagata, "Automatic Extraction of New Words from Japanese Texts using Generalized Forward-Backward Search", NTT Information and Communication Systems Laboratories, 1996. (Year: 1996).*

*Primary Examiner* — Anne L Thomas-Homescu
(74) *Attorney, Agent, or Firm* — Finnegan, Henderson, Farabow, Garrett & Dunner LLP

(57) ABSTRACT

Systems and methods are provided for detecting inaccuracy in a product title, comprising identifying, by running a string algorithm on a title associated with a product, at least one product type associated with the product, predicting, using a machine learning algorithm, at least one product type associated with the product based on the title, detecting an inaccuracy in the title, based on at least one of the identification or the prediction, and outputting, to a remote device, a message indicating that the title comprises the inaccuracy. Running the string algorithm may comprise receiving a set of strings, generating a tree based on the received set of strings, receiving the title, and traversing the generated tree using the title to find a match. Using the machine learning algorithm may comprise identifying words in the title, learning a vector representation for each character n-gram of each word, and summing each character n-gram.

20 Claims, 9 Drawing Sheets

(56) References Cited

U.S. PATENT DOCUMENTS

| | | | | |
|---|---|---|---|---|
| 2013/0035938 | A1* | 2/2013 | Jung | G10L 15/08 |
| | | | | 704/251 |
| 2016/0350288 | A1* | 12/2016 | Wick | G06F 40/242 |
| 2017/0060854 | A1* | 3/2017 | Zeng | G06F 40/205 |
| 2017/0133010 | A1* | 5/2017 | Printz | G10L 15/19 |
| 2018/0046619 | A1* | 2/2018 | Shi | G06F 40/47 |
| 2018/0137090 | A1* | 5/2018 | Duan | G06F 40/205 |
| 2018/0157644 | A1* | 6/2018 | Mandt | G06F 40/30 |
| 2018/0268548 | A1* | 9/2018 | Lin | G06K 9/6274 |
| 2018/0322370 | A1* | 11/2018 | Sun | G06F 15/76 |
| 2018/0375896 | A1* | 12/2018 | Wang | G06F 21/566 |
| 2019/0005019 | A1* | 1/2019 | Burke | G06F 19/36 |
| 2019/0243900 | A1* | 8/2019 | Gan | G06F 40/20 |
| 2019/0349399 | A1* | 11/2019 | Liu | G06F 16/355 |

FOREIGN PATENT DOCUMENTS

| | | | |
|---|---|---|---|
| CN | 107168955 B | * | 6/2019 |
| CN | 109981631 A | * | 7/2019 |
| CN | 110288980 A | * | 9/2019 |

\* cited by examiner

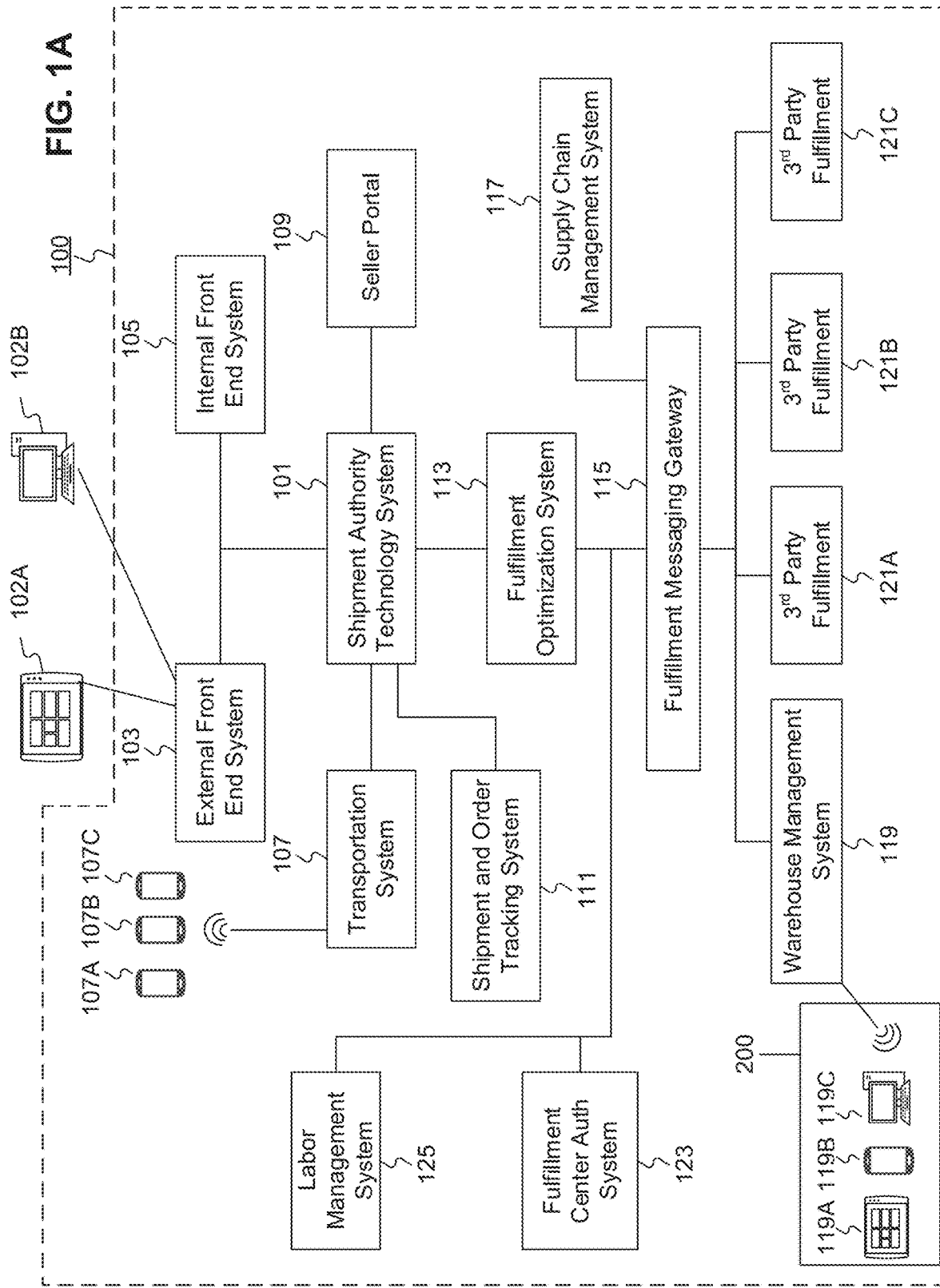

SYSTEMS AND METHODS FOR WORD SEGMENTATION BASED ON A COMPETING NEURAL CHARACTER LANGUAGE MODEL

TECHNICAL FIELD

The present disclosure generally relates to systems and methods for word segmentation based on a competing neural character language model. In particular, embodiments of the present disclosure relate to inventive and unconventional systems for unsupervised word segmentation based on a competing neural character language model to automatically segment to automatically segment product titles into words.

BACKGROUND

Consumers often shop for and purchase various items online through computers and smart devices. These online shoppers often rely on text searching to find products to purchase. For example, online shoppers often search for products by their product titles and/or product aliases. Therefore, retailers often categorize products for sale by their product titles and/or product aliases in order to provide accurate results when online shoppers search for product to purchase.

In order to categorize products by product titles and/or product aliases, many retailers rely on supervised word segmentation approaches to segment product titles into searchable keywords. However, supervised word segmentation approaches may not properly obey natural language grammars and, thus, may not be suitable for certain languages, including but not limited to, Asian languages. As such, product titles may not be properly segmented into accurate keywords, thereby incorrectly categorizing products for purchase and ultimately hindering a consumer's online shopping experience. In addition, when an online shopper searches for a particular product by inputting a text, improperly segmenting the text into words may hinder the retailers' ability to provide accurate search results. In addition, improper word segmentation may hinder the retailers' ability to recommend relevant products for purchase to consumers.

Improper word segmentation may, thus, severely reduce a consumer's user experience by prolonging the consumer's product search and by reducing the recommendation quality of the online platform. A consumer's user experience would be significantly improved if the online platform automatically segmented product titles into proper, accurate keywords.

Therefore, there is a need for improved methods and systems for unsupervised word segmentation of product titles so that consumers may quickly find and purchase products while online shopping.

SUMMARY

One aspect of the present disclosure is directed to a computer-implemented system for word segmentation. The system may comprise at least one processor; and at least one non-transitory storage medium comprising instructions that, when executed by the at least one processor, cause the at least one processor to perform steps. The steps may comprise receiving a plurality of characters for segmentation, converting, using an embedding model, a character of the plurality of characters into an embedding vector, feeding the embedding vector and a first context embedding vector sequence into a forward language model, feeding the embedding vector and a second context embedding vector sequence into a reverse language model, comparing the embedding vector to a first output vector and a second output vector, and segmenting the plurality of characters based on the comparison. The forward language model may be configured to output the first output vector, and the reverse language model may be configured to output the second output vector. Comparing the embedding vector to the first output vector and the second output vector may comprise determining a reverse exponent of a Euclidean distance between the embedding vector and each of the first output vector and the second output vector.

In some embodiments, the embedding model may comprise a projection layer and a softmax classifier layer. In other embodiments, the forward language model and the reverse language model may comprise a Recurrent Neural Network (RNN). Additionally or alternatively, the forward language model and the reverse language model may comprise at least one of a Gated Recurrent Unit (GRU) or a Long Short-Term Memory (LSTM).

In some embodiments, the first context embedding vector sequence may comprise a sequence of vectors associated with a predetermined number of characters preceding the character. In some embodiments, the second context embedding vector sequence may comprise a sequence of vectors associated with a predetermined number of characters following the character. In some embodiments, the at least one processor may be configured to execute the instructions to pair the character with the predetermined number of characters preceding the character when the reverse exponent of the Euclidean distance between the embedding vector and the first output vector is greater than the reverse exponent of the Euclidean distance between the embedding vector and the second output vector. In other embodiments, the at least one processor may be configured to execute the instructions to pair the character with the predetermined number of characters following the character when the reverse exponent of the Euclidean distance between the embedding vector and the second output vector is greater than the reverse exponent of the Euclidean distance between the embedding vector and the first output vector.

In some embodiments, the at least one processor may be configured to execute the instructions to repeat the steps of converting, feeding, comparing, and segmenting for each of the plurality of characters for segmentation until each character belongs to a word. In some embodiments, the at least one processor may be configured to execute the instructions to predict a number of segments in the plurality of characters based on a number of characters in the plurality of characters and an average word length.

Another aspect of the present disclosure is directed to a method for word segmentation. The method may comprise receiving a plurality of characters for segmentation, converting, using an embedding model, a character of the plurality of characters into an embedding vector, feeding the embedding vector and a first context embedding vector sequence into a forward language model, feeding the embedding vector and a second context embedding vector sequence into a reverse language model, comparing the embedding vector to a first output vector and a second output vector, and segmenting the plurality of characters based on the comparison. The forward language model may be configured to output the first output vector, and the reverse language model may be configured to output the second output vector. Comparing the embedding vector to the first output vector and the second output vector may comprise determining a reverse exponent of a Euclidean distance between the embedding vector and each of the first output vector and the second output vector.

In some embodiments, the embedding model may comprise a projection layer and a softmax classifier layer. In other embodiments, the forward language model and the reverse language model may comprise a Recurrent Neural Network (RNN). Additionally or alternatively, the forward language model and the reverse language model may comprise at least one of a Gated Recurrent Unit (GRU) or a Long Short-Term Memory (LSTM).

In some embodiments, the first context embedding vector sequence may comprise a sequence of vectors associated with a predetermined number of characters preceding the character. In some embodiments, the second context embedding vector sequence may comprise a sequence of vectors associated with a predetermined number of characters following the character. In some embodiments, the at least one processor may be configured to execute the instructions to pair the character with the predetermined number of characters preceding the character when the reverse exponent of the Euclidean distance between the embedding vector and the first output vector is greater than the reverse exponent of the Euclidean distance between the embedding vector and the second output vector. In other embodiments, the at least one processor may be configured to execute the instructions to pair the character with the predetermined number of characters following the character when the reverse exponent of the Euclidean distance between the embedding vector and the second output vector is greater than the reverse exponent of the Euclidean distance between the embedding vector and the first output vector.

In some embodiments, the at least one processor may be configured to execute the instructions to repeat the steps of converting, feeding, comparing, and segmenting for each of the plurality of characters for segmentation until each character belongs to a word. In some embodiments, the at least one processor may be configured to execute the instructions to predict a number of segments in the plurality of characters based on a number of characters in the plurality of characters and an average word length.

Yet another aspect of the present disclosure is directed to a computer-implemented system for word segmentation. The system may comprise at least one processor; and at least one non-transitory storage medium comprising instructions that, when executed by the at least one processor, cause the at least one processor to perform steps. The steps may comprise receiving a plurality of characters for segmentation, converting, using an embedding model, a character of the plurality of characters into an embedding vector, feeding the embedding vector and a first context embedding vector sequence into a forward language model, feeding the embedding vector and a second context embedding vector sequence into a reverse language model, comparing the embedding vector to a first output vector and a second output vector, and segmenting the plurality of characters based on the comparison. The forward language model may be configured to output the first output vector, and the reverse language model may be configured to output the second output vector. The first context embedding vector sequence may comprise a sequence of vectors associated with a predetermined number of characters preceding the character. The second context embedding vector sequence may comprise a sequence of vectors associated with a predetermined number of characters following the character. Comparing the embedding vector to the first output vector and the second output vector may comprise determining a reverse exponent of a Euclidean distance between the embedding vector and each of the first output vector and the second output vector.

Other systems, methods, and computer-readable media are also discussed herein.

BRIEF DESCRIPTION OF THE DRAWINGS

Figure 1C:
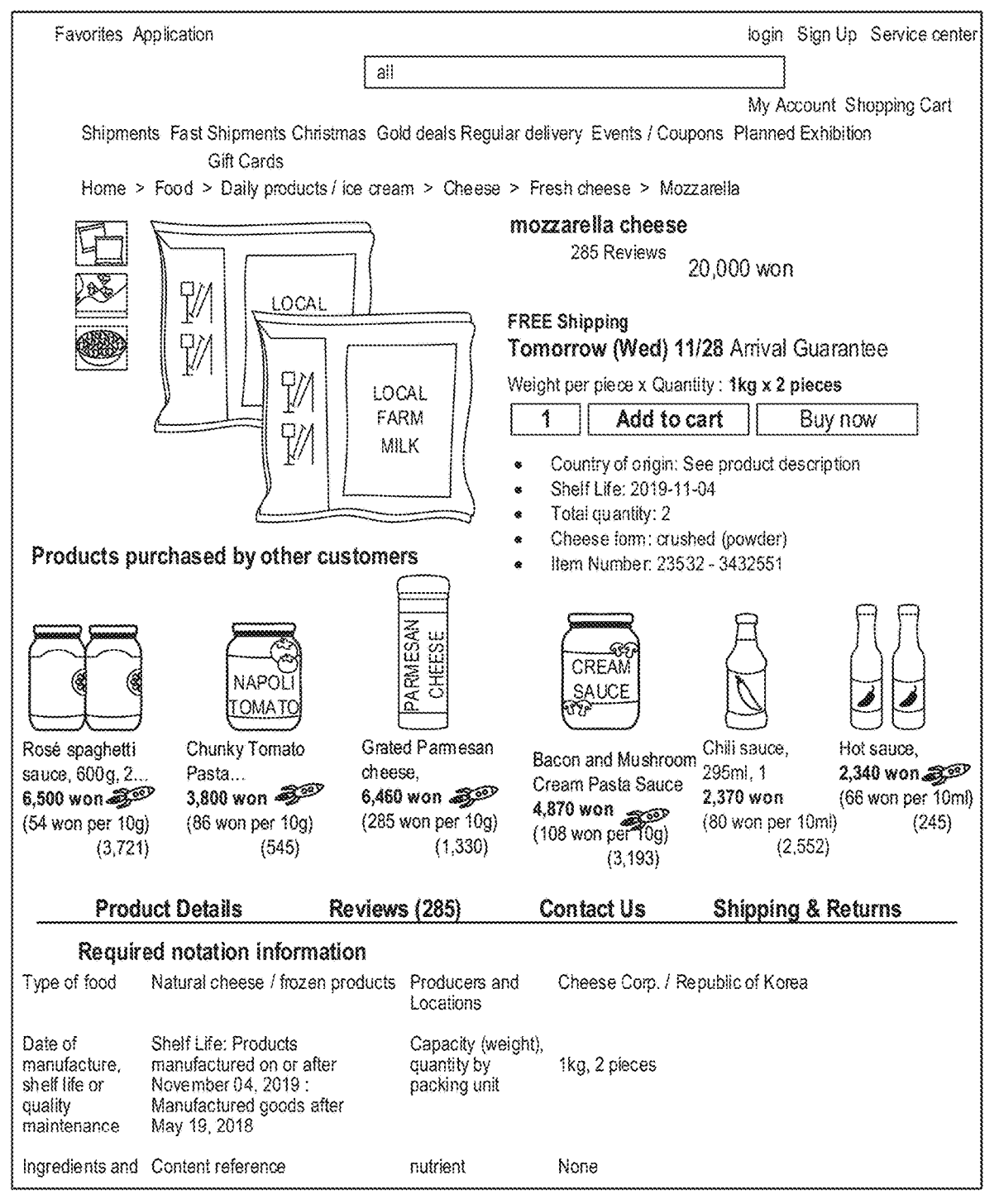

FIG. 1A is a schematic block diagram illustrating an exemplary embodiment of a network comprising computerized systems for communications enabling shipping, transportation, and logistics operations, consistent with the disclosed embodiments.

FIG. 1C depicts a sample Single Display Page (SDP) that includes a product and information about the product along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for word segmentation. The disclosed embodiments are advantageously capable of using a competing neural character language model to automatically perform unsupervised word segmentation, for example, on product titles.

In one implementation, a pre-processing system may pre-process the initial training data received from training data system to generate synthesized training data. For example, text-based initial training data may be pre-processed using any combination of methods, including stop word elimination, keyword tokenization, deduplication of keywords, and augmentation of the initial training data, and image-based initial training data may be pre-processed using image augmentation techniques (e.g., PyTorch). A hierarchical model trainer system may receive the text-based synthesized training data generated by the pre-processing system and an image model trainer system may receive the image-based synthesized training data generated by the pre-processing system. The hierarchical model trainer system and the image model trainer may generate and train at least one hierarchical model and at least one image model, respectively, using the received synthesized data for product categorization.

In some embodiments, a product category predictor may receive information associated with a first uncategorized product. For example, a seller may be prompted to enter a concatenated text string including the product name, attribute values, manufacturer, brand, and model number when attempting to register a product. The product category predictor may receive a request to predict a number of categories with the highest total probability scores. The product category predictor may use the hierarchical model to predict the most relevant categories of the first uncategorized product by recursively calculating probability scores of potential categories and subcategories. The product category predictor may subsequently sort the uncategorized product into one or more of the categories having the highest total probability scores.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
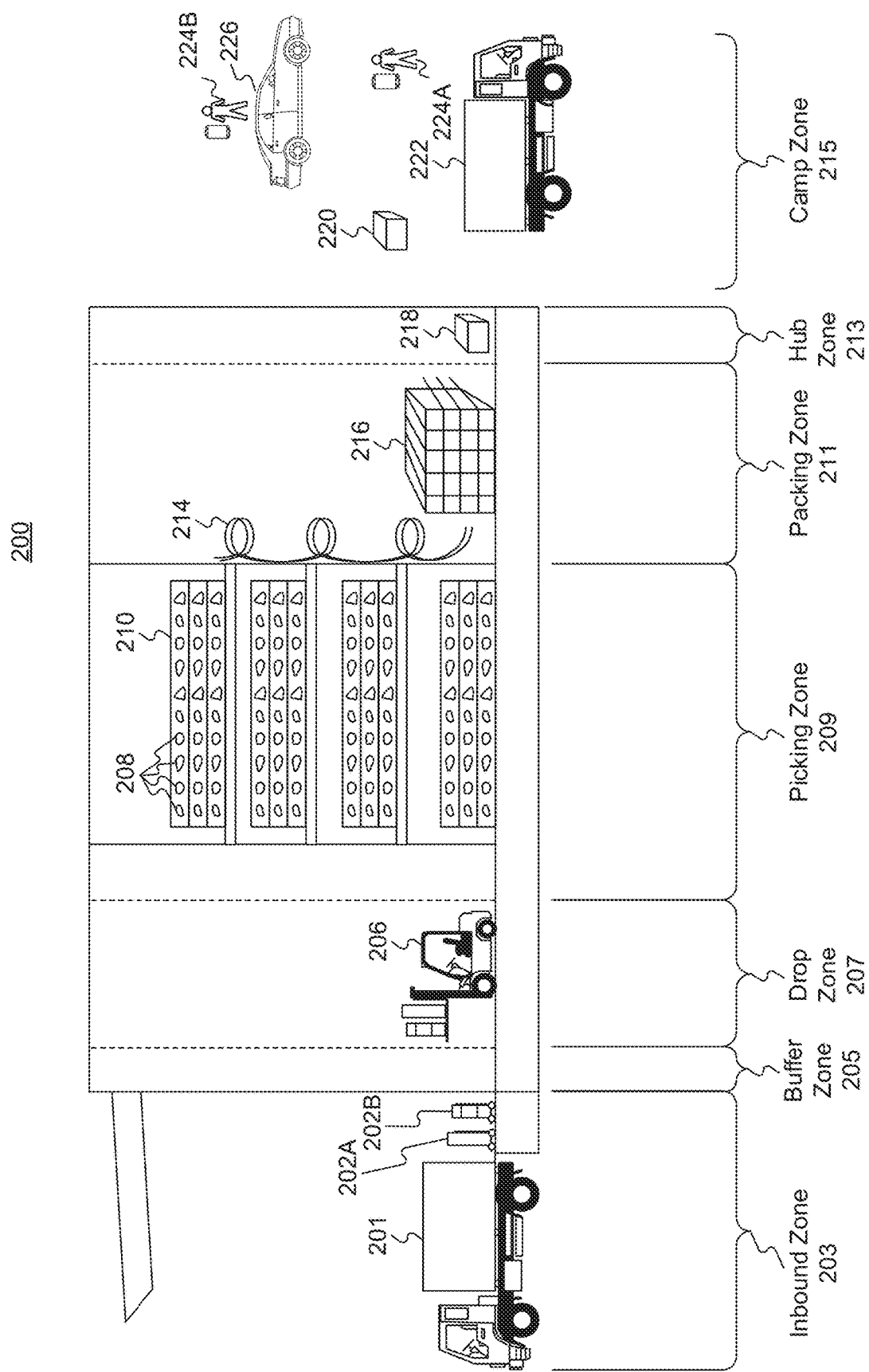
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
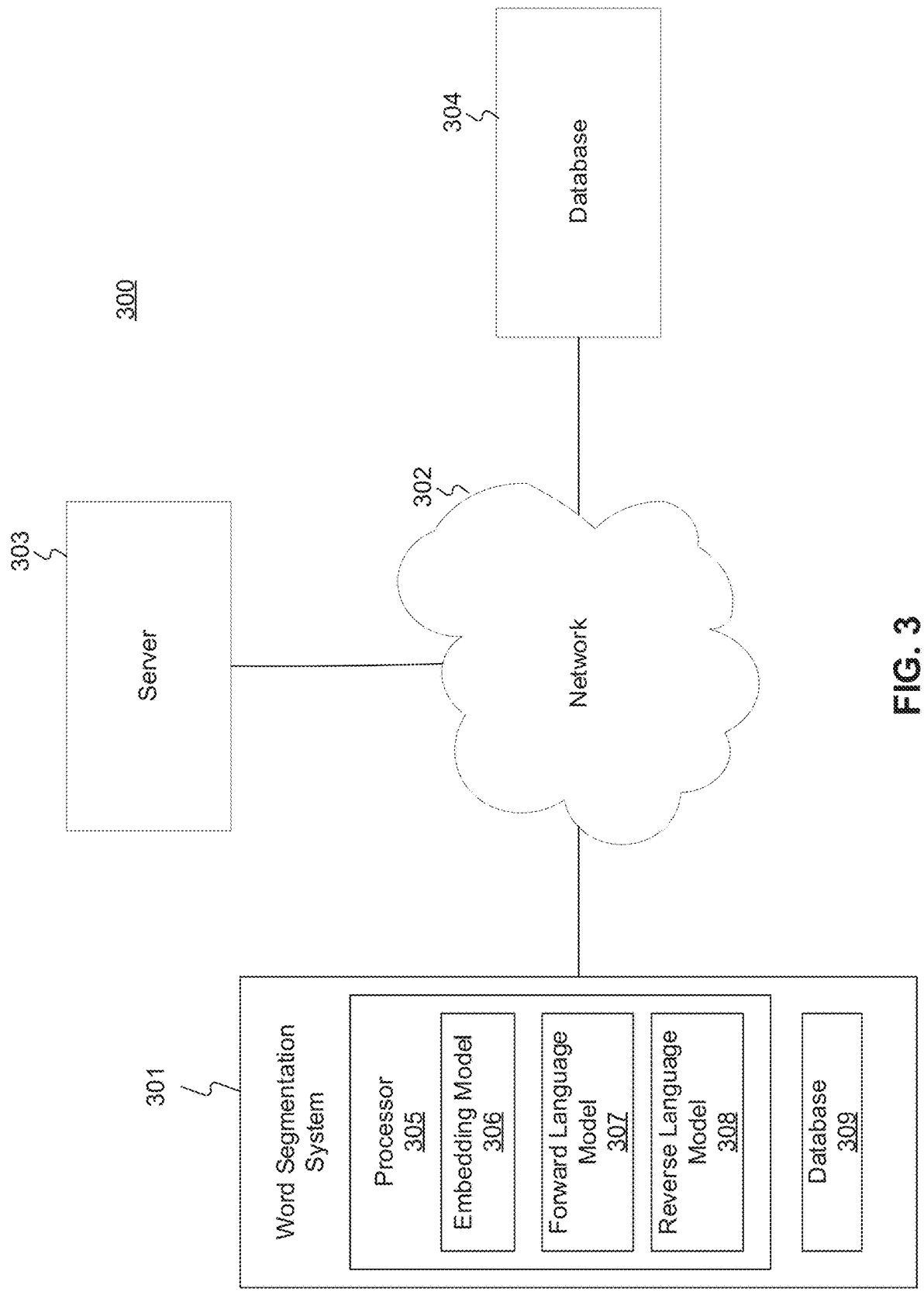
FIG. 3 is a schematic block diagram illustrating an exemplary embodiment of a system comprising computerized systems for word segmentation, consistent with the disclosed embodiments.

Referring to FIG. 3, a schematic block diagram illustrating an exemplary embodiment of a system for word segmentation is shown. As illustrated in FIG. 3, system 300 may comprise a word segmentation system 301, server 303, and database 304, each of which may communicate with each other via a network 302. In some embodiments, word segmentation system 301, server 303, and database 304 may communicate with each other and with the other components of system 300 via a direct connection, for example, using a cable. In some other embodiments, system 300 may be a part of system 100 of FIG. 1A and may communicate with the other components of system 100 (e.g., external front end system 103 or internal front end system 105) via network 302 or via a direct connection, for example, using a cable. Word segmentation system 301 may comprise a single computer or may each be configured as a distributed computer system including multiple computers that interoperate to perform one or more of the processes and functionalities associated with the disclosed examples.

As shown in FIG. 3, word segmentation system 301 may comprise a processor 305 and a database 309. Processor 305 may be one or more known processing devices, such as a microprocessor from the Pentium™ family manufactured by Intel™ or the Turion™ family manufactured by AMD™. Processor 305 may constitute a single core or multiple core processor that executes parallel processes simultaneously. For example, processor 305 may use logical processors to simultaneously execute and control multiple processes. Processor 305 may implement virtual machine technologies or other known technologies to provide the ability to execute, control, run, manipulate, store, etc. multiple software processes, applications, programs, etc. In another example, processor 305 may include a multiple-core processor arrangement configured to provide parallel processing functionalities to allow word segmentation system 301 to execute multiple processes simultaneously. One of ordinary skill in the art would understand that other types of processor arrangements could be implemented that provide for the capabilities disclosed herein.

Databases 304 and 309 may include, for example, Oracle™ databases, Sybase™ databases, or other relational databases or non-relational databases, such as Hadoop™ sequence files, HBase™, or Cassandra™. Databases 304 and 309 may include computing components (e.g., database management system, database server, etc.) configured to receive and process requests for data stored in memory devices of the database(s) and to provide data from the database(s). Databases 304 and 309 may include NoSQL databases such as HBase, MongoDB™ or Cassandra™. Alternatively, databases 304 and 309 may include relational databases such as Oracle, MySQL and Microsoft SQL Server. In some embodiments, databases 304 and 309 may take the form of servers, general purpose computers, mainframe computers, or any combination of these components.

Databases 304 and 309 may store data that may be used by processor 305 for performing methods and processes associated with disclosed examples. As shown in FIG. 3, database 309 may be located in word segmentation system 301. In some embodiments, database 304 may be located in word segmentation system 301. In some embodiments, system 300 may include one or both of database 304 or database 309. Data stored in word segmentation system 301 may include any suitable data associated with products that is needed for word segmentation. For example, data stored in word segmentation system 301 may include product titles, product names, product type names, product type keywords, related or synonymous product type keywords, product brand, product description, product manufacturer name, product category information, etc. In some embodiments, data stored in database 309 may include suitable training data associated with products. For example, data stored in database 309 may also include product titles, product names, product type names, product type keywords, related or synonymous product type keywords, product brand, product description, product manufacturer name, product category information, etc. In some embodiments, such training data associated with products may be stored in an external database, such as database 304, rather than directly in word segmentation system 301. Accordingly, word segmentation system 301 may communicate with database 304 via network 302 to train one or more models and/or algorithms associated with word segmentation system 301 using training data stored in database 304.

One or more processors 305 of word segmentation system 301 may also comprise an embedding model 306, a forward language model 307, and a reverse language model 308 used to facilitate word segmentation. Embedding model 306, forward language model 307, and reverse language model 308 may be trained to automatically segment words, such as product titles. Embedding model 306 may comprise a character embedding model configured to convert or embed input characters into vectors. Embedding model 306 may be trained using known models to produce word embeddings, such as word2vec model. In some embodiments, embedding model 306 may input character contexts from a dictionary of characters (e.g., c1, c2, c3, . . . , cn) stored in a database, such as database 304 or 309. In addition, a product title may comprise a sequence of characters cq1, cq2, cq3, . . . , cqn. Each character may be chosen from the dictionary of characters (e.g., c1, c2, c3, . . . , cn) stored in a database. Of the sequence of characters, a target character ci in the dictionary of characters may correspond to a one-hot vector, which has a dimension of 1 while all other characters' dimensions are 0.

Embedding model 306 may input character contexts and predict the actual character. The character context, for example, may comprise a number of characters directly preceding a target character and a number of characters directly following the target character in the sequence of characters cq1, cq2, cq3, . . . , cqn. For example, the character context for target character cqi may comprise (cqi−2, cqi−1, cqi+1, cqi+2). Embedding model 306 may comprise a projection layer and a softmax classifier layer. Embedding model 306 may sum each one-hot vector and feed the summed one-hot vectors into the projection layer. Then, projection layer may output a dense dimensioned vector, which may further be fed into the softmax classifier layer to predict the probability that the target character is the one-hot vector of cqi.

Forward language model 307 and reverse language model 308 may comprise artificial neural networks configured to process a sequence of inputs. For example, forward language model 307 and reverse language model 308 may comprise artificial neural networks, such as Recurrent Neural Networks (RNNs), Gated Recurrent Units (GRUs), Long short-Term Memory (LSTM), or the like. In some embodiments, one or more processors 305 may comprise more than one forward language model 307 and/or more than one reverse language model 308. In some embodiments, embedding model 306 may convert or embed a predetermined number of characters preceding a target character into vectors. The vector sequence produced by converting the predetermined number of characters preceding the target character into vectors may be input or fed to forward language model 307. Forward language model 307 may then be configured to output and predict an embedded vector of the target character, determined based on the vector sequence of characters preceding the target character. One or more processors 305 may also calculate a loss function of forward language model 307 by determining the Euclidean distance between the target character's embedding vector determined by embedding model 306 and the embedded vector of the target character predicted by forward language model 307. The loss function calculated may allow one or more processors 305 to determine the accuracy of the prediction by forward language model 307, e.g., similarity between the target character's embedding vector determined by embedding model 306 and the embedded vector of the target character predicted by forward language model 307.

In addition, embedding model 306 may convert or embed a predetermined number of characters following a target character into vectors. The vector sequence produced by converting the predetermined number of characters following the target character into vectors may be input or fed to reverse language model 308. Reverse language model 308 may then be configured to output and predict an embedded vector of the target character, determined based on the vector sequence of characters following the target character. One or more processors 305 may also calculate a loss function of reverse language model 308 by determining the Euclidean distance between the target character's embedding vector determined by embedding model 306 and the embedded vector of the target character predicted by reverse language model 308. The loss function calculated may allow one or more processors 305 to determine the accuracy of the prediction by reverse language model 308, e.g., similarity between the target character's embedding vector determined by embedding model 306 and the embedded vector of the target character predicted by reverse language model 308.

Additionally or alternatively, one or more processors 305 may be configured to determine a probability of forward language model 307 and/or reverse language model 308 predicting a target character by measuring a reverse exponent of the Euclidean distance between the prediction and the actual embedding vector of the target character determined by embedding model 306. The reverse exponent of target character may be calculated using the following equation:

$$\text{reverse exponent} = \exp\left(-\sqrt{(cqi - cqi')^2}\right)$$

where cqi is the actual embedding vector of the target character, and cqi' is the embedded vector of the target character predicted by forward language model 307 and/or reverse language model 308.

Accordingly, using the equation above, one or more processors 305 can determine whether the actual embedding vector of the target character is closer to the embedded vector of the target character predicted by forward language model 307 or reverse language model 308. That is, one or more processors 305 may use forward language model 307 to predict the embedded vector of the target character at position "i" (i.e. cqi') and reverse language model 308 to predict the embedded vector of the target character at position "i" (i.e. cqi'). Afterwards, one or more processors 305 may use the equation above to calculate a first reverse exponent using the embedded vector of the target character predicted by forward language model 307 and a second reverse exponent using the embedded vector of the target character predicted by reverse language model 308. If the actual embedding vector of the target character (i.e. cqi) is closer to the embedded vector of the target character predicted by forward language model 307, then the first reverse exponent calculated by one or more processors 305 will be higher than the second reverse exponent. In contrast, if the actual embedding vector of the target character (i.e. cqi) is closer to the embedded vector of the target character predicted by reverse language model 308, then the second reverse exponent calculated by one or more processors 305 will be higher than the first reverse exponent.

In some embodiments, one or more processors 305 may be configured to predict a number of segments in the plurality of characters based on a number of characters in the plurality of characters and an average word length. For example, one or more processors 305 may determine that the plurality of characters, such as a product title, comprises 30 characters and that an average word length is about 3 characters. Then, one or more processors 305 may be able to predict that there may be about 10 segments and/or segmented words in the plurality of characters received.

System 300 may also comprise a network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 802.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

System 300 may also comprise a server 303. Server 303 may be a web server. Server 303, for example, may include hardware (e.g., one or more computers) and/or software (e.g., one or more applications) that deliver web content that can be accessed by, for example a user through a network (e.g., network 302), such as the Internet. Server 303 may use, for example, a hypertext transfer protocol (HTTP or sHTTP) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and server 303 may respond with the content of that resource or an error message if unable to do so. Server 303 also may enable or facilitate receiving content from the user so the user may be able to, for example, submit web forms, including uploading of files. Server 303 may also support server-side scripting using, for example, Active Server Pages (ASP), PHP, or other scripting languages. Accordingly, the behavior of server 303 can be scripted in separate files, while the actual server software remains unchanged.

In other embodiments, server 303 may be an application server, which may include hardware and/or software that is dedicated to the efficient execution of procedures (e.g., programs, routines, scripts) for supporting its applied applications. Server 303 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Server 303 may act as a set of components accessible to, for example, an entity implementing system 100, through an API defined by the platform itself.

Figure 4:
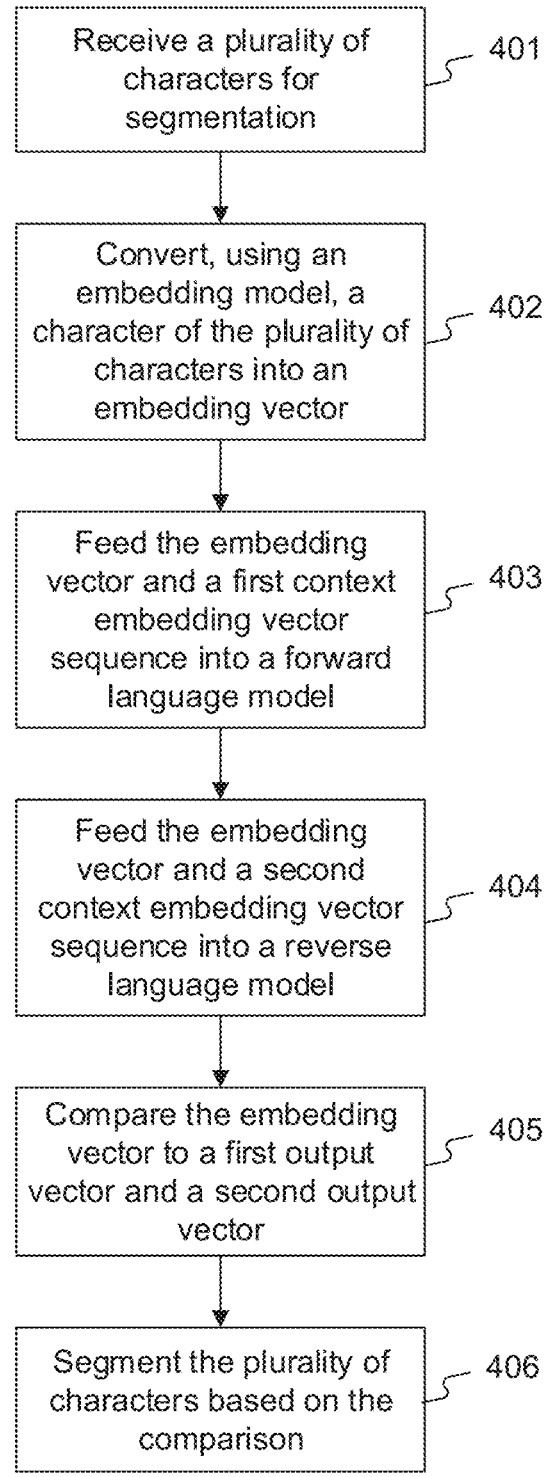
FIG. 4 is a flowchart illustrating an exemplary embodiment of a method for word segmentation, consistent with the disclosed embodiments.

FIG. 4 is a flow chart illustrating an exemplary method 400 for word segmentation. This exemplary method is provided by way of example. Method 400 shown in FIG. 4 can be executed or otherwise performed by one or more combinations of various systems. Method 400 as described below may be carried out by word segmentation system 301, as shown in FIG. 3, by way of example, and various elements of that system are referenced in explaining the method of FIG. 4. Each block shown in FIG. 4 represents one or more processes, methods, or subroutines in the exemplary method 400. Referring to FIG. 4, exemplary method 400 may begin at block 401.

At block 401, one or more processors 305 of word segmentation system 301 may receive a plurality of characters for segmentation. For example, one or more processors 305 may receive a product title associated with a product for segmentation. The product title, for example, may comprise a sequence of characters that make up the one or more words of the product title. The sequence of characters may need to be segmented in order to form the determine the proper words that make up the product title.

After receiving the plurality of characters for segmentation, method 400 may proceed to block 402. At block 402, one or more processors 305 may convert a target character of the plurality of characters into an embedding vector using an embedding model, such as embedding model 306. One or more processors 305 may convert, using embedding model 306, the target character into an embedding vector. Embedding model 306 may be trained using known models to produce word embeddings, such as word2vec model. In some embodiments, embedding model 306 may input character contexts from a dictionary of characters (e.g., c1, c2, c3, . . . , cn) stored in a database, such as database 304 or 309. In addition, a product title may comprise a sequence of characters cq1, cq2, cq3, . . . , cqn. Each character may be chosen from the dictionary of characters (e.g., c1, c2, c3, . . . , cn) stored in a database. Of the sequence of characters, a target character ci in the dictionary of characters may correspond to a one-hot vector, which has a dimension of 1 while all other characters' dimensions are 0.

Embedding model 306 may input character contexts and predict the actual target character, or the embedding vector thereof. The character context, for example, may comprise a number of characters directly preceding a target character and a number of characters directly following the target character in the sequence of characters cq1, cq2, cq3, . . . , cqn. For example, the character context for target character cqi may comprise (cqi−2, cqi−1, cqi+1, cqi+2). Embedding model 306 may comprise a projection layer and a softmax classifier layer. Embedding model 306 may sum each one-hot vector and feed the summed one-hot vectors into the projection layer. Then, projection layer may output a dense dimensioned vector, which may further be fed into the softmax classifier layer to predict the probability that the target character is the one-hot vector of cqi. Accordingly, embedding model 306 may output an actual embedding vector of the target character.

After converting the target character into an embedding vector, method 400 may proceed to block 403. At block 403, one or more processors 305 may feed the embedding vector determined at block 402 and a first context embedding vector sequence into a forward language model, such as forward language model 307. The first context embedding vector may comprise a sequence of vectors associated with a predetermined number of characters preceding the target character. Forward language model 307 may comprise artificial neural networks, such as Recurrent Neural Networks (RNNs), Gated Recurrent Units (GRUs), Long short-Term Memory (LSTM), or the like. In some embodiments, embedding model 306 may convert or embed a predetermined number of characters preceding a target character into vectors. The vector sequence produced by converting the predetermined number of characters preceding the target character into vectors may be input or fed to forward language model 307. Forward language model 307 may then be configured to output a first output vector. The first output vector may comprise a prediction of an embedded vector of the target character, determined based on the vector sequence of characters preceding the target character.

At block 404, one or more processors 305 may further feed the embedding vector determined at block 402 and a second context embedding vector sequence into a reverse language model, such as reverse language model 308. The second context embedding vector may comprise a sequence of vectors associated with a predetermined number of characters following the target character. Reverse language model 308 may comprise artificial neural networks, such as Recurrent Neural Networks (RNNs), Gated Recurrent Units (GRUs), Long short-Term Memory (LSTM), or the like. In some embodiments, embedding model 306 may convert or embed a predetermined number of characters following a target character into vectors. The vector sequence produced by converting the predetermined number of characters following the target character into vectors may be input or fed to reverse language model 308. Reverse language model 308 may then be configured to output a second output vector. The second output vector may be a prediction of an embedded vector of the target character, determined based on the vector sequence of characters following the target character.

After feeding forward language model 307 and reverse language model 308, method 400 may proceed to block 405. At block 405, one or more processors may compare the embedding vector determined by embedding model 306 at block 402 to the first output vector from block 403 and the second output vector from block 404. In order to compare, one or more processors 305 may calculate a loss function of forward language model 307 and reverse language model 308 by determining the Euclidean distance between the target character's embedding vector (from block 402) determined by embedding model 306 and each of the first output vector predicted by forward language model 307 (from block 403) and the second output vector predicted by reverse language model 308 (from block 404). The loss function calculated may allow one or more processors 305 to determine the accuracy of the prediction by forward language model 307 and reverse language model 308.

Additionally or alternatively, one or more processors 305 may be configured to determine a probability of forward language model 307 and/or reverse language model 308 predicting a target character by measuring a reverse exponent of the Euclidean distance between the prediction and the actual embedding vector of the target character determined by embedding model 306. The reverse exponent of target character cqi may be calculated using the following equation:

$$\text{reverse exponent} = \exp\left(-\sqrt{(cqi - cqi')^2}\right)$$

where cqi is the actual embedding vector of the target character, and cqi' is the embedded vector of the target character predicted by forward language model 307 and/or reverse language model 308.

Accordingly, using the equation above, one or more processors 305 can determine whether the actual embedding vector of the target character is closer to the embedded vector of the target character predicted by forward language model 307 or reverse language model 308. That is, one or more processors 305 may use forward language model 307 to predict the embedded vector of the target character at position "i" (i.e. cqi') and reverse language model 308 to predict the embedded vector of the target character at position "i" (i.e. cqi'). Afterwards, one or more processors 305 may use the equation above to calculate a first reverse exponent using the embedded vector of the target character predicted by forward language model 307 and a second reverse exponent using the embedded vector of the target character predicted by reverse language model 308. If the actual embedding vector of the target character (i.e. cqi) is closer to the embedded vector of the target character predicted by forward language model 307, then the first reverse exponent calculated by one or more processors 305 will be higher than the second reverse exponent. In contrast, if the actual embedding vector of the target character (i.e. cqi) is closer to the embedded vector of the target character predicted by reverse language model 308, then the second reverse exponent calculated by one or more processors 305 will be higher than the first reverse exponent.

After comparing the embedding vector to the first output vector and the second output vector, method 400 may proceed to block 406. At block 406, one or more processors 305 may segment the plurality of characters based on the comparison. In order to segment the characters, one or more processors 305 may determine whether the reverse exponent of the Euclidean distance between the embedding vector (from block 402) and the first output vector (from block 403) is greater than the reverse exponent of the Euclidean distance between the embedding vector (from block 402) and the second output vector (from block 404). That is, one or more processors 305 may determine whether the actual embedding vector of the target character determined by embedding model 306 is closer to the first output vector determined by forward language model 307 or the second output vector determined by reverse language model 308.

When the reverse exponent of the Euclidean distance between the embedding vector and the first output vector is greater than the reverse exponent of the Euclidean distance between the embedding vector and the second output vector, one or more processors 305 may pair the target character with the predetermined number of characters preceding the character. Similarly, when the reverse exponent of the Euclidean distance between the embedding vector and the second output vector is greater than the reverse exponent of the Euclidean distance between the embedding vector and the first output vector, one or more processors 305 may pair the target character with the predetermined number of characters following the character. In some embodiments, one or more processors 305 may repeat steps 402-406 until each of the plurality of characters received at block 401 belongs to a word and segmentation of the plurality of characters is complete.

Figure 5:
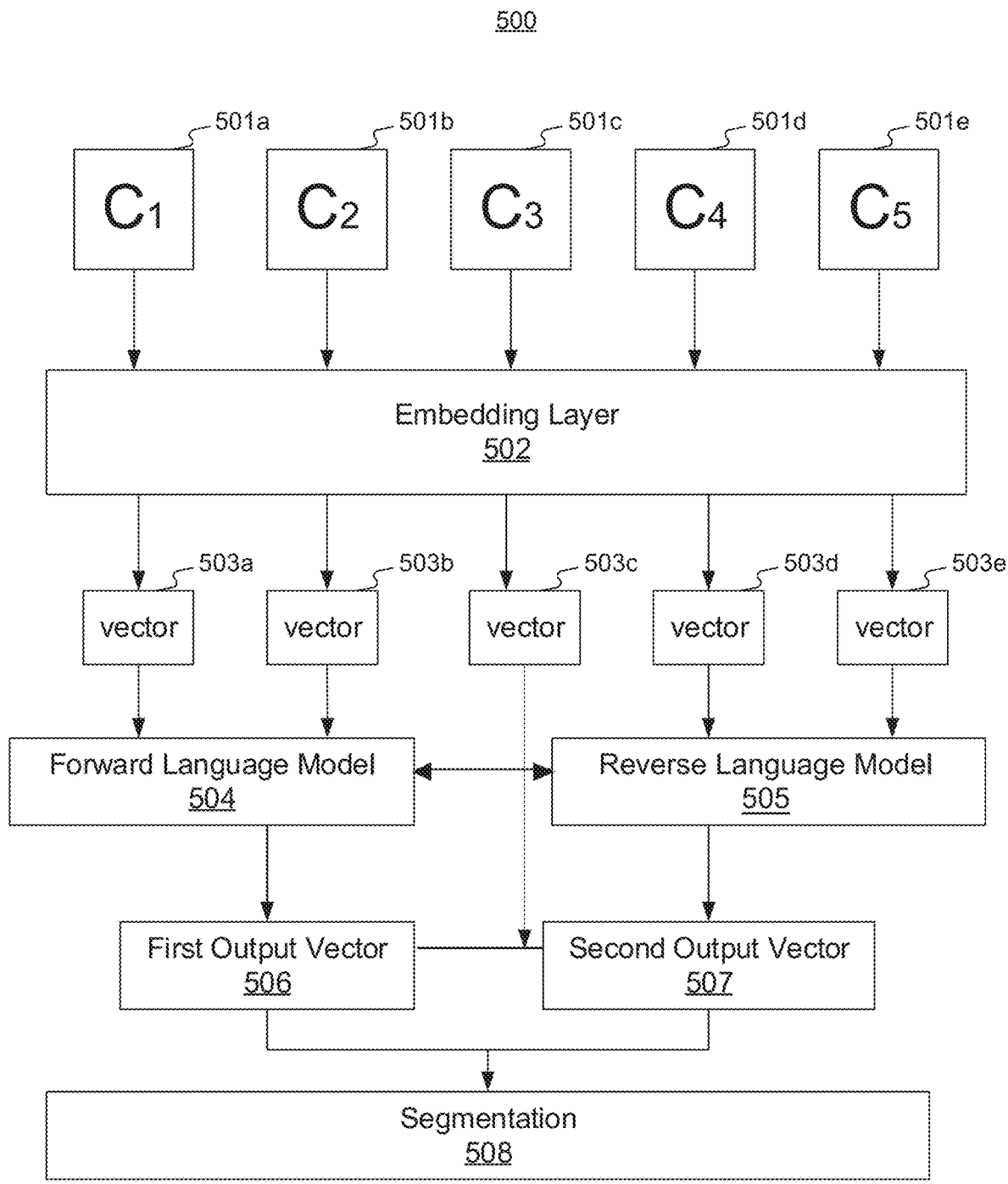
FIG. 5 is a diagram illustrating an exemplary embodiment of a method for using a competing neural character language model to perform unsupervised word segmentation, consistent with the disclosed embodiments.

FIG. 5 illustrates an exemplary embodiment of a method 500 for using a competing neural character language model to perform unsupervised word segmentation, consistent with the disclosed embodiments. As seen in FIG. 5, one or more processors 305 may receive a plurality of characters 501a-e. The plurality of characters 501a-e may comprise a plurality of characters that make up a product identifier, such as a product title or a product name.

One or more processors 305 may embed each of the plurality of characters 501a-e into an embedding layer 502 and convert each of the plurality of characters 501a-e into a respective vector 503a-e. Accordingly, each character may be represented by an embedded vector. In some embodiments, each respective embedding vector 503a-e may be an actual embedding vector of each respective character 501a-e. For example, if the plurality of characters 501a-e comprise "shoes," then each letter may be converted to respective vectors 503a-e (e.g., "s," "h," "o," "e," and "s" may each be converted into respective vectors).

After converting each character 501a-e, including a target character 501c, into respective embedding vectors 503a-e, one or more processors 305 may feed embedding vector 503c of target character 501c and first context embedding vector into a forward language model 504. Forward language model 504 may be implemented as forward language model 307 of FIG. 3. The first context embedding vector may comprise a sequence of vectors 503a and 503b associated with characters 501a and 501b preceding target character 501c. For example, in the above example, the vector for "o" in "shoes" may be the target character 501c, and the first context embedding vector may comprise "sh." Forward language model 504 may comprise artificial neural networks, such as Recurrent Neural Networks (RNNs), Gated Recurrent Units (GRUs), Long short-Term Memory (LSTM), or the like. Forward language model 307 may then be configured to output a first output vector 506. The first output vector 506 may comprise a prediction of an embedded vector of target character 501c, determined based on the sequence of vectors 503a and 503b of characters 501a and 501b preceding target character 501c. For example, forward language model 504 may predict the vector of target character 501c based on the first context embedding vector for "sh" (e.g., forward language model 504 may predict what character comes after "sh").

One or more processors 305 may further feed embedding vector 503c of target character 501c and second context embedding vector into a reverse language model 505. Reverse language model 505 may be implemented as reverse language model 308 of FIG. 3. The second context embedding vector may comprise a sequence of vectors 503d and 503e associated with characters 501d and 501e following target character 501c. For example, in the above example, the vector for "o" in "shoes" may be the target character 501c, and the second context embedding vector may comprise "es." Reverse language model 505 may comprise artificial neural networks, such as Recurrent Neural Networks (RNNs), Gated Recurrent Units (GRUs), Long short-Term Memory (LSTM), or the like. Reverse language model 505 may then be configured to output a second output vector 507. The second output vector 507 may comprise a prediction of an embedded vector of target character 501c, determined based on the sequence of vectors 503d and 503e of characters 501d and 501e following target character 501c. For example, reverse language model 505 may predict the vector of target character 501c based on the second context embedding vector for "es" (e.g., reverse language model 505 may predict what character comes before "es").

Thereafter, one or more processors may compare the actual embedding vector 503c of target character 501c to the first output vector 506 and the second output vector 507. For example, one or more processors may compare the actual embedding vector 503c of target character "o" in "shoes" to the first output vector 506 and the second output vector 507. In order to compare, one or more processors 305 may calculate a loss function of forward language model 504 and reverse language model 505 by determining the Euclidean distance between the actual embedding vector 503c of target character 501c and each of the first output vector 506 predicted by forward language model 504 and the second output vector 507 predicted by reverse language model 505. The loss function calculated may allow one or more processors 305 to determine the accuracy of the prediction by forward language model 504 and reverse language model 505.

Additionally or alternatively, one or more processors 305 may be configured to determine a probability of forward language model 504 and/or reverse language model 505 predicting target character 501c by measuring a reverse exponent of the Euclidean distance between the prediction and the actual embedding vector 503c of target character 501c. The reverse exponent of target character 501c ("cqi") may be calculated using the following equation:

$$\text{reverse exponent} = \exp\left(-\sqrt{(cqi - cqi')^2}\right)$$

where cqi is the actual embedding vector of the target character, and cqi' is the embedded vector of the target character predicted by forward language model 307 and/or reverse language model 308.

Accordingly, using the equation above, one or more processors 305 can determine whether the actual embedding vector of the target character is closer to the embedded vector of the target character predicted by forward language model 307 or reverse language model 308. That is, one or more processors 305 may use forward language model 307 to predict the embedded vector of the target character at position "i" (i.e. cqi') and reverse language model 308 to predict the embedded vector of the target character at position "i" (i.e. cqi'). Afterwards, one or more processors 305 may use the equation above to calculate a first reverse exponent using the embedded vector of the target character predicted by forward language model 307 and a second reverse exponent using the embedded vector of the target character predicted by reverse language model 308. If the actual embedding vector of the target character (i.e. cqi) is closer to the embedded vector of the target character predicted by forward language model 307, then the first reverse exponent calculated by one or more processors 305 will be higher than the second reverse exponent. In contrast, if the actual embedding vector of the target character (i.e. cqi) is closer to the embedded vector of the target character predicted by reverse language model 308, then the second reverse exponent calculated by one or more processors 305 will be higher than the first reverse exponent.

After comparing the actual embedding vector 503c to the first output vector 506 and the second output vector 507, one or more processors 305 may segment the plurality of characters 501a-e based on the comparison and output the segmentation 508, such as a segmented product title. In order to segment the characters, one or more processors 305 may determine whether the reverse exponent of the Euclidean distance between the actual embedding vector 503c and the first output vector 506 is greater than the reverse exponent of the Euclidean distance between the actual embedding vector 503c and the second output vector 507. If, for example, the reverse exponent of the Euclidean distance between the actual embedding vector 503c of "o" in "shoes" and the first output vector 506 is greater than the reverse exponent of the Euclidean distance between the actual embedding vector 503c of "o" and the second output vector 507, one or more processors 305 may determine that "sh" and "o" should not be segmented, but rather kept together as "sho." This process can be repeated until each letter in the exemplary word "shoes" belongs to a word.

When the reverse exponent of the Euclidean distance between the actual embedding vector 503c and the first output vector 506 is greater than the reverse exponent of the Euclidean distance between the actual embedding vector 503c and the second output vector 507, one or more processors 305 may pair target character 501c with the characters 501a and 501b preceding the target character 501c. Similarly, when the reverse exponent of the Euclidean distance between the actual embedding vector 503c and the second output vector 507 is greater than the reverse exponent of the Euclidean distance between the actual embedding vector 503c and the first output vector 506, one or more processors 305 may pair the target character 501c with the characters 501d and 501e following the target character 501c. In some embodiments, one or more processors 305 may these steps until each of the plurality of characters 501a-e belongs to a word and segmentation of the plurality of characters 501a-e is complete.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for word segmentation, the system comprising:
 a memory storing instructions; and
 at least one processor configured to execute the instructions to:

receive a plurality of characters for segmentation;
convert, using an embedding model, a character of the plurality of characters into an embedding vector;
feed the embedding vector and a first context embedding vector sequence into a forward language model, wherein the forward language model is configured to output a first output vector;
feed the embedding vector and a second context embedding vector sequence into a reverse language model, wherein the reverse language model is configured to output a second output vector;
compare the embedding vector to the first output vector and the second output vector; and
segment the plurality of characters based on the comparison,
wherein comparing the embedding vector to the first output vector and the second output vector comprises determining a reverse exponent of a Euclidean distance between the embedding vector and each of the first output vector and the second output vector.

2. The system of claim 1, wherein the embedding model comprises a projection layer and a softmax classifier layer.

3. The system of claim 1, wherein the forward language model and the reverse language model comprises a Recurrent Neural Network (RNN).

4. The system of claim 3, wherein the forward language model and the reverse language model comprises at least one of a Gated Recurrent Unit (GRU) or a Long Short-Term Memory (LSTM).

5. The system of claim 1, wherein the first context embedding vector sequence comprises a sequence of vectors associated with a predetermined number of characters preceding the character.

6. The system of claim 1, wherein the second context embedding vector sequence comprises a sequence of vectors associated with a predetermined number of characters following the character.

7. The system of claim 5, wherein the at least one processor is configured to execute the instructions to pair the character with the predetermined number of characters preceding the character when the reverse exponent of the Euclidean distance between the embedding vector and the first output vector is greater than the reverse exponent of the Euclidean distance between the embedding vector and the second output vector.

8. The system of claim 6, wherein the at least one processor is configured to execute the instructions to pair the character with the predetermined number of characters following the character when the reverse exponent of the Euclidean distance between the embedding vector and the second output vector is greater than the reverse exponent of the Euclidean distance between the embedding vector and the first output vector.

9. The system of claim 1, wherein the at least one processor is configured to execute the instructions to repeat the steps of converting, feeding, comparing, and segmenting for each of the plurality of characters for segmentation until each character belongs to a word.

10. The system of claim 1, wherein the at least one processor is configured to execute the instructions to predict a number of segments in the plurality of characters based on a number of characters in the plurality of characters and an average word length.

11. A computer-implemented method for word segmentation, the method comprising:

receiving a plurality of characters for segmentation;
converting, using an embedding model, a character of the plurality of characters into an embedding vector;
feeding the embedding vector and a first context embedding vector sequence into a forward language model, wherein the forward language model is configured to output a first output vector;
feeding the embedding vector and a second context embedding vector sequence into a reverse language model, wherein the reverse language model is configured to output a second output vector;
comparing the embedding vector to the first output vector and the second output vector; and
segmenting the plurality of characters based on the comparison,
wherein comparing the embedding vector to the first output vector and the second output vector comprises determining a reverse exponent of a Euclidean distance between the embedding vector and each of the first output vector and the second output vector.

12. The method of claim 11, wherein the embedding model comprises a projection layer and a softmax classifier layer.

13. The method of claim 11, wherein the forward language model and the reverse language model comprises a Recurrent Neural Network (RNN).

14. The method of claim 13, wherein the forward language model and the reverse language model comprises at least one of a Gated Recurrent Unit (GRU) or a Long Short-Term Memory (LSTM).

15. The method of claim 11, wherein the first context embedding vector sequence comprises a sequence of vectors associated with a predetermined number of characters preceding the character.

16. The method of claim 11, wherein the second context embedding vector sequence comprises a sequence of vectors associated with a predetermined number of characters following the character.

17. The method of claim 15, further comprising pairing the character with the predetermined number of characters preceding the character when the reverse exponent of the Euclidean distance between the embedding vector and the first output vector is greater than the reverse exponent of the Euclidean distance between the embedding vector and the second output vector.

18. The method of claim 16, further comprising pairing the character with the predetermined number of characters following the character when the reverse exponent of the Euclidean distance between the embedding vector and the second output vector is greater than the reverse exponent of the Euclidean distance between the embedding vector and the first output vector.

19. The method of claim 11, further comprising repeating the steps of converting, feeding, comparing, and segmenting for each of the plurality of characters for segmentation until each character belongs to a word.

20. A computer-implemented system for word segmentation, the system comprising:
a memory storing instructions; and
at least one processor configured to execute the instructions to:
receive a plurality of characters for segmentation;
convert, using an embedding model, a character of the plurality of characters into an embedding vector;
feed the embedding vector and a first context embedding vector sequence into a forward language model, wherein the forward language model is configured to output a first output vector, and wherein the first context embedding vector sequence comprises a sequence of vectors associated with a predetermined number of characters preceding the character;

feed the embedding vector and a second context embedding vector sequence into a reverse language model, wherein the reverse language model is configured to output a second output vector, and wherein the second context embedding vector sequence comprises a sequence of vectors associated with a predetermined number of characters following the character;

compare the embedding vector to the first output vector and the second output vector; and segment the plurality of characters based on the comparison, wherein comparing the embedding vector to the first output vector and the second output vector comprises determining a reverse exponent of a Euclidean distance between the embedding vector and each of the first output vector and the second output vector.

* * * * *